(12) United States Patent
Kitsunai et al.

(10) Patent No.: US 9,012,047 B2
(45) Date of Patent: *Apr. 21, 2015

(54) SUBSTRATE FOR MAGNETIC DISK AND MAGNETIC DISK

(71) Applicant: Hoya Corporation, Tokyo (JP)

(72) Inventors: Kouji Kitsunai, Tokyo (JP); Hiroshi Takeda, Tokyo (JP); Yukari Senda, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,742

(22) Filed: Apr. 7, 2014

(65) Prior Publication Data

US 2014/0220386 A1    Aug. 7, 2014

Related U.S. Application Data

(62) Division of application No. 13/001,984, filed as application No. PCT/JP2009/061821 on Jun. 29, 2009, now Pat. No. 8,734,967.

(30) Foreign Application Priority Data

Jun. 30, 2008    (JP) .................................. 2008-171356

(51) Int. Cl.
*G11B 5/73* (2006.01)
*C03C 3/083* (2006.01)
(Continued)

(52) U.S. Cl.
CPC ............... *G11B 5/7315* (2013.01); *G11B 5/82* (2013.01); *G11B 20/1816* (2013.01); *G11B 2220/2516* (2013.01); *C03C 3/083* (2013.01)

(58) Field of Classification Search
CPC ........... G11B 20/1816; G11B 20/1889; G11B 2220/2516; G11B 5/7315; G11B 5/82; C03C 3/083

USPC ................. 428/64.1, 64.2, 800, 848.6, 848.8, 428/848.5, 848.9, 848; 73/1.89, 105; 451/40, 41, 44, 60; 360/131, 132, 133, 360/134, 135, 136; 438/795, 478; 65/61
See application file for complete search history.

(56) References Cited

U.S. PATENT DOCUMENTS

| 8,734,967 B2 * | 5/2014 | Kitsunai et al. ............ 428/846.9 |
| 2001/0008715 A1 | 7/2001 | Lin et al. |

(Continued)

FOREIGN PATENT DOCUMENTS

| JP | 8-077553 A | 3/1996 |
| JP | 10-162343 A | 6/1998 |

(Continued)

OTHER PUBLICATIONS

Japanese Office Action corresponding to Japanese Patent Application No. 2010-519054, mailed Oct. 31, 2012.

(Continued)

*Primary Examiner* — Kevin M. Bernatz
(74) *Attorney, Agent, or Firm* — Sughrue Mion, PLLC

(57) ABSTRACT

The shape and number of surface defects are controlled so that the occurrence of failure is suppressed in an HDD device in which a magnetic head with a very small flying height, such as a DFH head, is mounted.

A magnetic disk substrate is characterized in that when laser light with a wavelength of 405 nm and a laser power of 25 mW is irradiated with a spot size of 5 μm and scattered light from the substrate is detected, the number of defects detected to have a size of 0.1 μm to not more than 0.3 μm is less than 50 per 24 cm² and, with respect to the defects, there is no defect in which, in a bearing curve obtained by a bearing curve plot method using an atomic force microscope, a portion from an apex of the defect to 45% thereof is located in an area of defect height higher than a virtual line connecting from the apex of the defect to 45% thereof.

9 Claims, 6 Drawing Sheets

(51) Int. Cl.
*G11B 5/82* (2006.01)
*G11B 20/18* (2006.01)

(56) References Cited

U.S. PATENT DOCUMENTS

| | | |
|---|---|---|
| 2001/0049031 A1 | 12/2001 | Bajorek et al. |
| 2002/0142191 A1 | 10/2002 | Sakai et al. |
| 2005/0287933 A1 | 12/2005 | Maeda |
| 2006/0062129 A1 | 3/2006 | Saito et al. |
| 2006/0194080 A1 | 8/2006 | Ishii et al. |
| 2008/0160788 A1 | 7/2008 | Shive et al. |
| 2008/0224270 A1 | 9/2008 | Ikubo et al. |
| 2009/0148725 A1 | 6/2009 | Minazawa |
| 2009/0233529 A1* | 9/2009 | Ueda .............................. 451/60 |
| 2009/0239102 A1 | 9/2009 | Nagashima et al. |

FOREIGN PATENT DOCUMENTS

| | | | |
|---|---|---|---|
| JP | 10-283626 A | 10/1998 | |
| JP | 2002-055061 A | 2/2002 | |
| JP | 2008105171 A | 5/2008 | |
| JP | 5335789 B2 | 11/2013 | |
| WO | 2008041493 | * 10/2008 | ............... G11B 5/73 |

OTHER PUBLICATIONS

Japanese Office Action corresponding to Japanese Patent Application No. 2010-519054, mailed Mar. 27, 2013.

* cited by examiner

SUBSTRATE FOR MAGNETIC DISK AND MAGNETIC DISK

This is a Divisional of application Ser. No. 13/001,984 filed Dec. 29, 2010, claiming priority based on International Application No. PCT/JP2009/061821 filed Jun. 29, 2009, claiming priority based on Japanese Patent Application No. 2008-171356, filed on Jun. 20, 2008, the disclosures of which are incorporated herein in their entirety by reference.

TECHNICAL FIELD

This invention relates to a magnetic disk substrate adapted to be mounted in a hard disk drive device and to the magnetic disk.

BACKGROUND ART

As a magnetic recording medium adapted to be mounted in a hard disk drive device (HDD device), there is a magnetic disk. The magnetic disk is produced by stacking a magnetic layer and a protective layer over a substrate such as a substrate in which a NiP film is coated on a metal plate made of an aluminum-magnesium alloy or the like, a glass substrate, or a ceramic substrate. Conventionally, aluminum alloy substrates have been widely used as substrates for magnetic disks. However, following the reduction in size and thickness and the increase in recording density of magnetic disks in recent years, there have been used glass substrates which are excellent in surface flatness and in strength even with small thickness as compared with the aluminum alloy substrates.

With respect to a magnetic disk produced by forming at least a magnetic layer on such a magnetic disk substrate, defects present on a surface thereof are inspected. For example, Patent Document 1 discloses that defect detection of a magnetic disk substrate is performed using a defect detection optical system which comprises a light projection system that projects a light beam having a width in a direction at a right angle to a main scanning direction to relatively scan a transmissive substrate, and further comprises a light receiving system comprising a high magnification objective lens that receives scattered light from the transmissive substrate in a direction perpendicular to a surface of the transmissive substrate, and further comprising a light receiving device having light receiving elements that are arranged along a direction of corresponding image formation in the right-angle direction and receive light from the objective lens, thereby forming an image at a scanned position of the transmissive substrate on the light receiving elements.

PRIOR ART DOCUMENT

Patent Document

Patent Document 1: JP-A-2002-55061

SUMMARY OF THE INVENTION

Problem to be Solved by the Invention

In recent years, in HDD devices, the distance (flying height) between a magnetic head and a magnetic disk has been reduced and, particularly in the case of mounting a recording head (DFH (dynamic fly Hight)) for perpendicular recording having a slider that is adapted to adjust the flying height by expansion due to heat of a heater, the flying height is further reduced. In order to suppress failure when used as a magnetic disk, the size of a defect on a substrate surface allowed for the magnetic disk has also been reduced as the flying height has been reduced. Correspondingly, the requirement for the shape and number of surface defects of substrates for magnetic disks has also become strict.

This invention has been made in view of the above and has an object to provide a magnetic disk substrate and a magnetic disk in which the shape and number of surface defects are controlled so that it is possible to suppress the occurrence of failure in an HDD device in which a magnetic head with a very small flying height, such as a DFH head, is mounted.

Means for Solving the Problem

The present inventors performed a defect inspection of manufactured magnetic disk glass substrates, then manufactured magnetic disks using the magnetic disk glass substrates with approximately the same number and size of defects, and then conducted a certification test and a glide test. As a result, good products and defective products were mixed. Further, as a result of conducting the above-mentioned tests for magnetic disk glass substrates with defects whose number and size were greater than those of the magnetic disk glass substrates subjected to the above-mentioned tests, there was a case with more good products.

As a result of intensive studies on the above-mentioned phenomenon, the present inventors have found that a defect of specific size and shape largely affects the results of the certification test and the glide test and that it is possible to provide a magnetic disk and a magnetic disk glass substrate with improved reliability by removing such a defect, and have completed this invention.

Further, the present inventors have found that defects are inevitably present on a magnetic disk substrate and, when use is made of a magnetic head with a very small flying height, such as a DFH head, the magnetic disk substrate and the magnetic head may inevitably be brought into contact with each other. In this case, the present inventors have paid attention to the fact that the shape of the defects present on the magnetic disk substrate is more important than the number thereof. That is, the present inventors have paid attention to the fact that, in an HDD device in which a magnetic head with a very small flying height, such as a DFH head, is mounted, not only the size and number of defects present on a magnetic disk substrate, but also the shape thereof is influential.

Further, the present inventors have found that the above-mentioned influence of the shape of the defects notably appears when the surface roughness of the substrate is low. That is, the present inventors have found that, in terms of reliability, when the surface roughness is high, the influence of the surface roughness is greater than the influence of the defects and thus the influence exerted by the defects of the above-mentioned specific shape is small, while, when the surface roughness Ra becomes 0.15 nm or less, the influence of the defects of the specific shape increases and thus it is necessary to eliminate such defects of the specific shape for improving the reliability.

In the meantime, as the defect supposed to be influential in the case of the magnetic head with the very small flying height, such as the DFH head, a defect having a cross-section shown in FIG. 1A, i.e. a defect with a broad convex area, is considered. The defect with such a broad convex area is a defect with a relatively large area which is brought into contact with the magnetic head, and thus with a relatively large impact energy to the magnetic head. Accordingly, large impact energy is applied to the magnetic head and thus, as a result, the magnetic head becomes unusable. On the other hand, as different from the defect shown in FIG. 1A, a defect having a cross-section shown in FIG. 1B, i.e. a defect with a sharp convex area, is a defect with a relatively small area which is brought into contact with the magnetic head, and thus with a relatively small impact energy to the magnetic head. Therefore, it is considered not to affect the driving of the magnetic head so much.

Specifically, a magnetic disk substrate according to this invention has a main surface and has a structure wherein a surface roughness Ra is 0.15 nm or less when a 2 μm×2 μm square measurement area of the main surface is measured using an atomic force microscope with a resolution of 256× 256 pixels, and wherein when laser light with a wavelength of 405 nm and a power of 25 mW is irradiated with a spot size of 5 μm onto the main surface of the substrate and scattered light from the main surface of the substrate is detected, the number of defects detected to have a size of 0.1 μm or more and 0.3 μm or less is less than 50 per 24 cm$^2$ and, with respect to all the defects detected, there is no defect in which, in a bearing curve obtained by a bearing curve plot method using the atomic force microscope, a portion from an apex (height at 0%) of the defect to a height at 45% thereof is located in an area of defect height higher than a virtual line connecting between the apex (height at 0%) of the defect and a point of the height at 45%.

Preferably, the magnetic disk substrate according to this invention is used as a magnetic disk substrate adapted for a DFH (dynamic fly Hight) head.

Preferably, the magnetic disk substrate according to this invention has a structure wherein, with respect to only one main surface, the surface roughness Ra is 0.15 nm or less when the 2 μm×2 μm square measurement area of the main surface is measured using the atomic force microscope with the resolution of 256×256 pixels, and wherein when the laser light with the wavelength of 405 nm and the power of 25 mW is irradiated with the spot size of 5 μm onto the main surface of the substrate and the scattered light from the main surface of the substrate is detected, the number of the defects detected to have the size of 0.1 μm or more and 0.3 μm or less is less than 50 per 24 cm$^2$ and, with respect to all the defects detected, there is no defect in which, in the bearing curve obtained by the bearing curve plot method using the atomic force microscope, the portion from the apex (height at 0%) of the defect to the height at 45% is located in the area of defect height higher than the virtual line connecting between the apex (height at 0%) of the defect and the point of the height at 45%.

Preferably, the magnetic disk substrate according to this invention is used as a magnetic disk substrate of a heat assisted magnetic recording type.

Preferably, the magnetic disk substrate according to this invention has a structure wherein the substrate has a disk shape with a hole at a center thereof and, assuming that a distance from the center to an outermost periphery is 100%, a difference (RaO-RaI) between an arithmetic mean roughness (RaO) of the main surface in a range of 80% to 90% from the center and an arithmetic mean roughness (RaI) of the main surface in a range of 10 to 20% from the center is 0.01 or less (a value when the 2 μm×2 μm square measurement area is measured using the atomic force microscope with the resolution of 256×256 pixels).

A magnetic disk substrate according to this invention has a structure wherein when laser light with a wavelength of 405 nm and a laser power of 25 mW is irradiated with a spot size of 5 μm onto the substrate and scattered light from the substrate is detected, the number of defects detected to have a size of 0.1 μm to not more than 0.3 μm is less than 50 per 24 cm$^2$ and, with respect to the defects, there is no defect in which, in a bearing curve obtained by a bearing curve plot method using an atomic force microscope, a portion from an apex of the defect to 45% thereof is located in an area of defect height higher than a virtual line connecting from the apex of the defect to 45% thereof.

According to this structure, the shape and number of surface defects are controlled so that it is possible to suppress the occurrence of failure in an HDD device in which a magnetic head with a very small flying height, such as a DFH head, is mounted.

In the magnetic disk substrate according to this invention, the atomic force microscope is preferably an atomic force microscope with a resolution of at least 256×256 pixels in a 2 μm square.

Preferably, the magnetic disk substrate according to this invention is made of an aluminosilicate glass.

A magnetic disk according to this invention comprises the magnetic disk substrate according to this invention and a magnetic recording layer formed on the magnetic disk substrate.

A magnetic disk according to this invention has a structure wherein when laser light with a wavelength of 405 nm and a laser power of 25 mW is irradiated with a spot size of 5 μm and scattered light from the substrate is detected, the number of defects detected to have a size of 0.1 μm to not more than 0.3 μm is less than 50 per 24 cm$^2$ and, with respect to the defects, there is no defect in which, in a bearing curve obtained by a bearing curve plot method using an atomic force microscope, a portion from an apex of the defect to 45% thereof is located in an area of defect height higher than a virtual line connecting from the apex of the defect to 45% thereof.

Effect of the Invention

A magnetic disk substrate of this invention is such that when laser light with a wavelength of 405 nm and a laser power of 25 mW is irradiated with a spot size of 5 μm onto the substrate and scattered light from the substrate is detected, the number of defects detected to have a size of 0.1 μm to not more than 0.3 μm is less than 50 per 24 cm$^2$ and, with respect to the defects, there is no defect in which, in a bearing curve obtained by a bearing curve plot method using an atomic force microscope, a portion from an apex of the defect to 45% thereof is located in an area of defect height higher than a virtual line connecting from the apex of the defect to 45% thereof. Therefore, the shape and number of surface defects are controlled so that it is possible to suppress the occurrence of failure in an HDD device in which a magnetic head with a very small flying height, such as a DFH head, is mounted.

MODE FOR CARRYING OUT THE INVENTION

Hereinbelow, an embodiment of this invention will be described in detail with reference to the accompanying drawings. In this embodiment, a description will be given of the case where a magnetic disk substrate is a glass substrate.

Figure 1A:
FIG. 1A is a diagram showing the shape of a defect on a magnetic disk substrate according to an embodiment of this invention.

The technical idea of this invention is to provide a state where there is no defect having a cross-section shown in FIG. 1A, i.e. no defect with a broad convex area, thereby suppressing the occurrence of failure in an HDD device in which a magnetic head with a very small flying height, such as a DFH head, is mounted.

Herein, the defect having the cross-section shown in FIG. 1A, i.e. the defect with the broad convex area, represents a defect in which, in a bearing curve obtained by a bearing curve plot method using an atomic force microscope (AFM), a portion from an apex of the defect to 45% thereof is located in an area of defect height higher than a virtual line connecting between the apex of the defect and a point of 45% thereof.

Figure 2A:
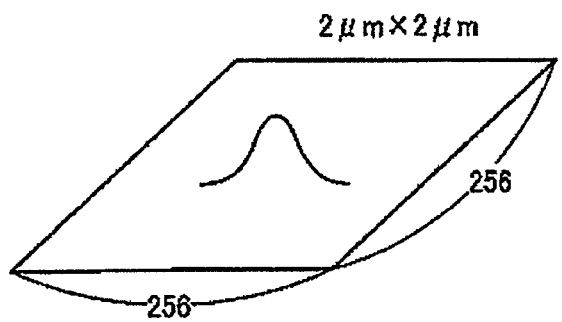
FIG. 2A is a diagram for explaining the principle of detecting the height of a defect.
Figure 2B:
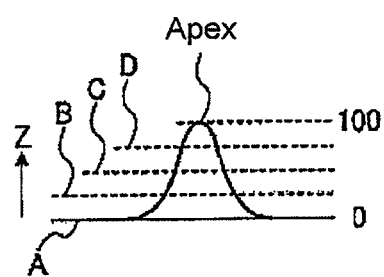
FIG. 2B is a diagram for explaining the principle of detecting the height of the defect.

The bearing curve obtained by the bearing curve plot method using the atomic force microscope represents a curve that shows a distribution of heights (z-coordinates) of respective pixels forming a three-dimensional structure shown in FIG. 2A, in a range from 0% (z-coordinate position where all the pixels are included, i.e. the lowest z-coordinate position in the three-dimensional image) to 100% (highest z-coordinate position in the three-dimensional image) with respect to the height in a Z-direction shown in FIG. 2B. When the three-dimensional image is sectioned along plane A shown in FIG. 2B, all the pixels are included, while, as the height in the Z-direction of a cross-section is increased little by little in order of B, C, and D shown in FIG. 2B, the number of pixels included in the respective cross-sections is generally reduced.

Figure 3:
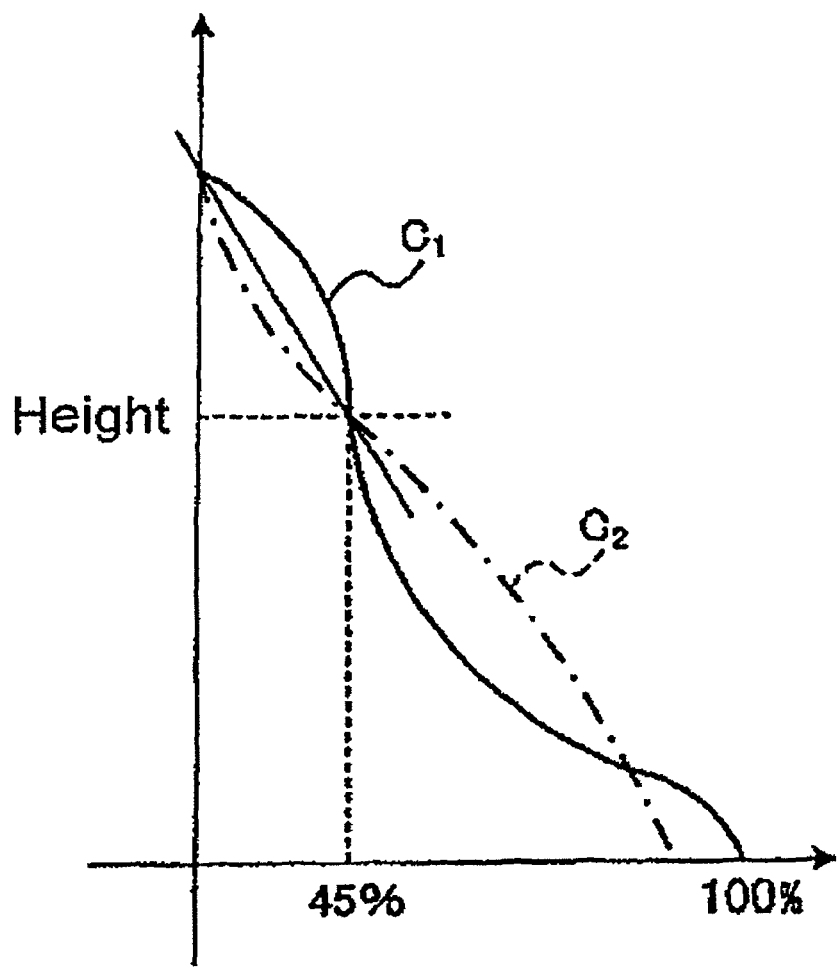
FIG. 3 is a diagram showing bearing curves obtained using an atomic force microscope (AFM).

FIG. 3 shows examples of bearing curves obtained by the bearing curve plot method using the atomic force microscope. In FIG. 3, the ordinate axis represents the height from a substrate surface, wherein the substrate surface is given by 0% and the position (highest point) farthest from the substrate surface is given by 100%. In FIG. 3, the abscissa axis represents the cumulative count number from the substrate surface. Herein, the atomic force microscope is an atomic force microscope with, as shown in FIG. 2A, a resolution of at least 256×256 pixels in a 2 µm square. In the case of a magnetic disk with a recording density of 240 GB, the bit length is 17 nm while, in the case of a magnetic disk with a recording density of 320 GB, the bit length is 15 nm. Therefore, in order to measure a defect of a substrate for the magnetic disk with the recording density of such a level, the resolution of at least 256×256 pixels in a 2 µm square is required. Herein, with respect to each bearing curve shown in FIG. 3, area setting is carried out so that an objective defect occupies 45%, in order to achieve accurate measurement of the defect.

Figure 1B:
FIG. 1B is a diagram showing the shape of a defect on the magnetic disk substrate according to the embodiment of this invention.

When a bearing curve of the defect of the shape shown in FIG. 1A is obtained under such conditions, it is obtained as C1 shown in FIG. 3. In this bearing curve, a portion from an apex of the defect to 45% thereof is located in an area of defect height higher than a virtual line (reference line) connecting from the apex of the defect to 45% thereof, i.e. is located in an area on the right side of the reference line (straight line) in FIG. 3. On the other hand, a bearing curve of the defect of the shape shown in FIG. 1B is obtained as C2 shown in FIG. 3. In this bearing curve, a portion from an apex of the defect to 45% thereof is located in an area of defect height lower than a virtual line (reference line) connecting from the apex of the defect to 45% thereof, i.e. is located in an area on the left side of the reference line (straight line) in FIG. 3.

With respect to an area of judging whether the portion from the apex of the defect to 45% thereof is higher or lower in defect height than the virtual line (reference line) connecting from the apex of the defect to 45% thereof, it is preferably an area from 5% to 45% from the apex taking into account that noise is included in an area of 5% from the apex.

Therefore, as described above, in order to suppress the occurrence of failure in the HDD device in which the magnetic head with the very small flying height, such as the DFH head, is mounted, it is necessary that there be no defect with a broad convex area, i.e. there be no defect in which, in the bearing curve obtained by the bearing curve plot method using the atomic force microscope, the portion from the apex of the defect to 45% thereof is located in the area of defect height higher than the virtual line connecting from the apex of the defect to 45% thereof.

This defect judgment is performed after specifying defects in advance using an optical defect inspection apparatus (Optical Surface Analyzer: OSA) shown in FIG. 4. The apparatus shown in FIG. 4 comprises a defect detection probe laser 11 and a detector 12 which is adapted to detect scattered laser light in almost all directions. In the apparatus shown in FIG. 4, the laser size is as small as, for example, about 5 µm, the laser wavelength is short, and the power is large so that the defect detection sensitivity is high.

Figure 4:
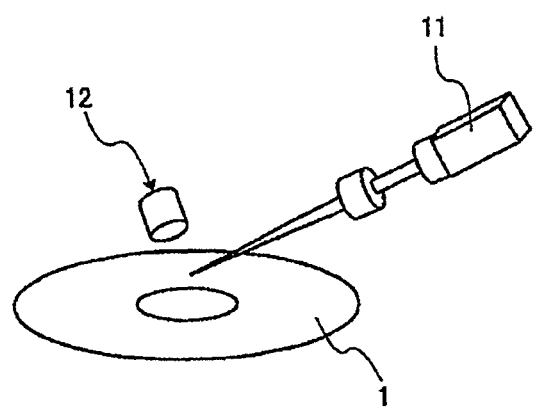
FIG. 4 is a diagram showing a schematic structure of an apparatus for detecting a defect on a magnetic disk substrate.

With respect to the number of defects by the use of the apparatus shown in FIG. 4, it is judged whether or not the number of defects detected to have a size of 0.1 µm to not more than 0.3 µm is less than 50 per 24 cm$^2$ when laser light with a wavelength of 405 nm and a laser power of 25 mW is irradiated with a spot size of 5 µm onto the substrate and scattered light from the substrate is detected. Herein, in consideration of accurately performing defect detection (S/N ratio), the defect size is 0.1 µm or more while, in consideration of magnetic properties and so on required for a magnetic disk with a high recording density of 240 GB or more, the defect size is 0.3 µm or less.

Figure 5A:
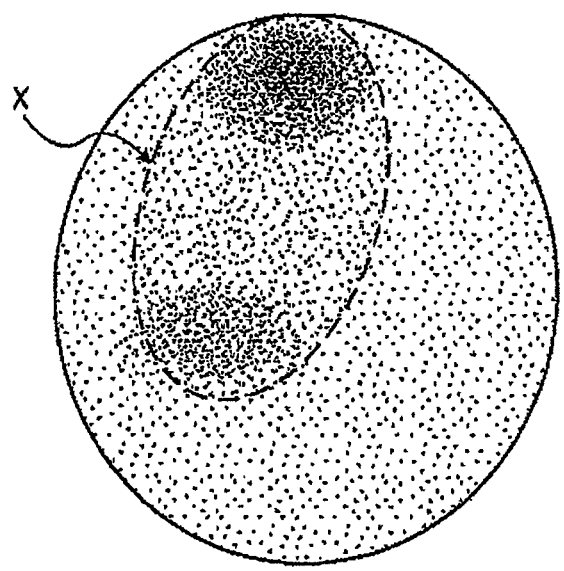
FIG. 5A is a diagram for explaining the sensitivity of the apparatus shown in FIG. 4.
Figure 5B:
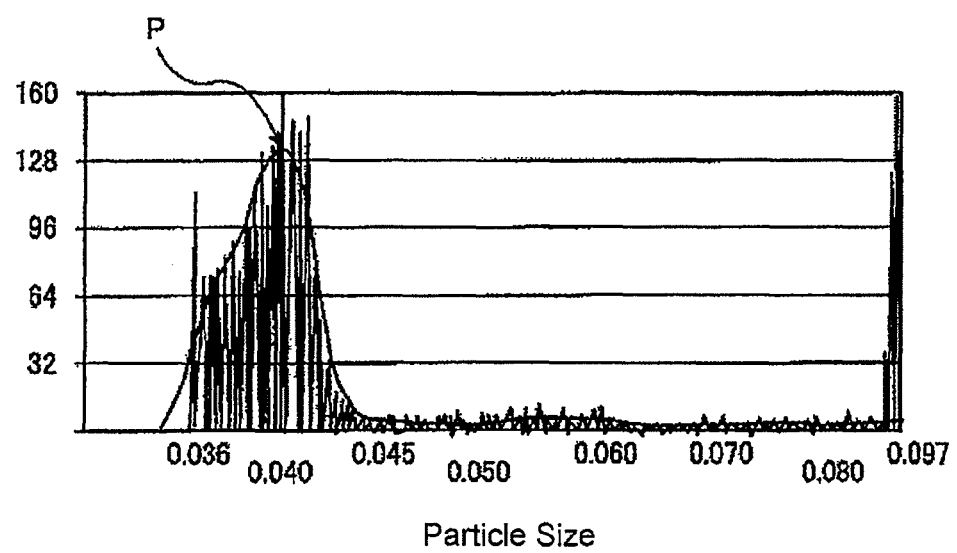
FIG. 5B is a diagram for explaining the sensitivity of the apparatus shown in FIG. 4.

The detection of the number of defects of such a size is largely affected by the noise level of the apparatus shown in FIG. 4. It is necessary that the defect size be defined per apparatus. In order to define the defect size, a histogram of the signal intensity is produced by, for example, as shown in FIG. 5A, performing measurement in a state X where standard particles (polystyrene particles) with a particle size of 0.3 µm are scattered on a glass substrate. Then, the histogram is obtained as shown in FIG. 5B. The noise level should be such that a peak P on this occasion can be separated. For example, the difference between the number of detected defects distributed at signal intensities greater than the peak intensity and the number of detected defects around the peak is required to be 1 to 10 or more.

Figure 6:
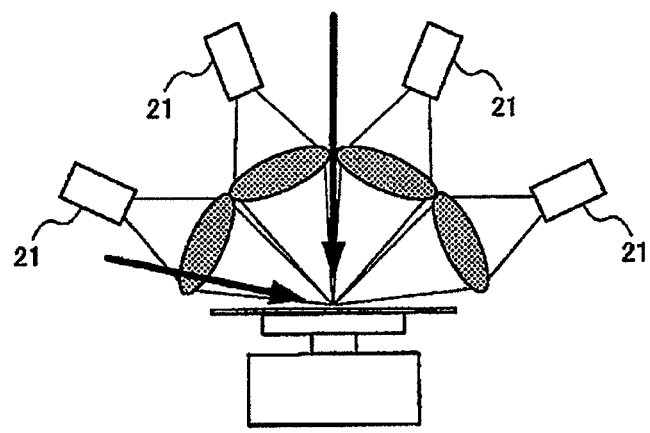
FIG. 6 is a diagram showing another example of an apparatus for detecting a defect on a magnetic disk substrate.

In the case of an apparatus, which is shown in FIG. 6, comprising detectors 21 that can almost detect scattered light in all directions like the apparatus shown in FIG. 4, it can be similarly used in this invention.

As described above, in this invention, it is controlled such that when, using the apparatus shown in FIG. 4, laser light with a wavelength of 405 nm and a laser power of 25 mW is irradiated with a spot size of 5 µm onto the substrate and scattered light from the substrate is detected, the number of defects detected to have a size of 0.1 µm to not more than 0.3 µm is less than 50 per 24 cm², and further that, with respect to these defects, there is no defect in which, in a bearing curve obtained by the bearing curve plot method using the atomic force microscope, a portion from an apex of the defect to 45% thereof is located in an area of defect height higher than a virtual line connecting from the apex of the defect to 45% thereof. That is, in a magnetic disk substrate 1 of this invention, the number of defects with a size of 0.1 µm to not more than 0.3 µm is set to a predetermined number or less and further there is provided a state with no defect having a broad convex area. Therefore, it is possible to suppress the occurrence of failure in an HDD device in which a magnetic head with a very small flying height, such as a DFH head, is mounted.

Hereinbelow, the magnetic disk substrate will be described.

As a material of the magnetic disk substrate, use can be made of an aluminosilicate glass, a sodalime glass, a borosilicate glass, an aluminum-magnesium alloy, or the like. Particularly as an amorphous glass, the aluminosilicate glass can be preferably used in terms of capability of being chemically strengthened and capability of providing a magnetic disk substrate which is excellent in main surface flatness and substrate strength. As a material property of the glass, use can be made of an amorphous glass or a glass ceramic (crystallized glass).

A magnetic disk is fabricated by forming at least a magnetic layer on the magnetic disk substrate having the above-mentioned structure. That is, normally, a magnetic disk is manufactured by stacking an underlayer, a magnetic layer, a protective layer, and a lubricating layer in this order on a magnetic disk substrate. The underlayer in the magnetic disk is suitably selected depending on the magnetic layer.

Next, a manufacturing method of a magnetic disk substrate according to this invention will be described. In the following description, a manufacturing method of a magnetic disk glass substrate will be described.

The manufacture of the magnetic disk substrate comprises (1) Shaping Process and First Lapping Process, (2) End Portion Shaping Process (coring process for forming a hole and chamfering process for forming chamfered faces at end portions (outer peripheral end portion and inner peripheral end portion) (chamfered face forming process)), (3) End Face Polishing Process (outer peripheral end portion and inner peripheral end portion), (4) Second Lapping Process, and (5) Main Surface Polishing Process (first and second polishing processes). When the magnetic disk substrate is a glass substrate, a chemical strengthening process may be carried out after the main surface polishing process if necessary. Further, there is a case where the end portion polishing process and the second lapping process are reversed in order.

As described above, the magnetic disk substrate is manufactured through the various processes, but, in order to prevent the formation of the specific defect shape, among defect shapes which are formed on the substrate main surfaces, as in the case of the magnetic disk substrate according to this embodiment, particularly the final polishing process (second polishing process) becomes important.

The requirement for the shape of the substrate main surfaces has been much more strict following the improvement in recording density and most of factors that determine the shape/size thereof depend on the polishing conditions of the final polishing process. Many of various polishing conditions in the final polishing process affect the shape of the substrate main surfaces, but, in order to prevent the occurrence of a defect of the specific shape, particularly the processing rate (processing speed) and the processing pressure are influential.

Hereinbelow, a description will be given of the final polishing process that polishes main surfaces of a glass substrate using a planetary gear type polishing machine. It is needless to say that the final polishing process can be carried out without using the planetary gear type polishing machine. For example, the final polishing process may be applied to the glass substrate using a single wafer type polishing machine.

In the final polishing process, the glass substrate is polished by relatively moving polishing pads and the glass substrate while pressing the polishing pads onto both main surfaces of the glass substrate. In this event, the machining amount per unit time is the processing rate and the pressure pressing the glass substrate is the processing pressure.

For manufacturing the magnetic glass substrate according to this embodiment, it is preferable that the processing rate be set in a range of 0.20 µm/min to 0.45 µm/min and the processing pressure be set in a range of 8.0 Pa to 10.5 Pa. The other polishing conditions have relatively small influences and thus are not limitative, but in the case of, for example, a 2.5-inch disk (φ65 mm), it is possible to set the hardness of the polishing pads to 85 (Asker C hardness) and the particle size of an abrasive to 0.8 (µm).

For manufacturing the magnetic disk substrate according to this embodiment, it is preferable that, after polishing the substrate at the processing pressure (main processing pressure) intended for the polishing processing, the substrate be polished at a processing pressure (e.g. 1 Pa or less) lower than the main processing pressure in the final polishing process. Particularly, it is preferable that the polishing be carried out at this low processing pressure for a time about half the polishing time of polishing the substrate at the main processing pressure. This makes it possible to reduce the number of defects and to prevent the occurrence of an abnormal defect (defect of the specific shape).

For manufacturing the magnetic disk substrate according to this embodiment, it is preferable to obtain a magnetic disk glass substrate by, after applying a chemical strengthening treatment to a glass substrate capable of being chemically strengthened, polishing main surfaces of the substrate. By polishing the substrate main surfaces after applying the chemical strengthening treatment (ion-exchange treatment), the roughness of the main surfaces can be further reduced. Particularly, the substrate surface roughness required for the recent perpendicular magnetic recording system has been significantly decreasing than conventional. In order to satisfy this requirement, it is preferable to obtain the magnetic disk glass substrate by applying the main surface polishing treatment after the chemical strengthening treatment.

The surface roughness Ra of the magnetic disk substrate according to this embodiment, measured using an AFM (electron force microscope), is preferably 0.15 nm or less.

For manufacturing the magnetic disk substrate according to this embodiment, when performing final polishing using the planetary gear type polishing machine, the relationship between the on-its-axis rotation speed of a carrier and the orbital rotation speed of the carrier orbiting in the machine also becomes important.

In the planetary gear type, a plurality of glass substrates are held in the carrier. Then, polishing pads are pressed onto upper and lower surfaces of the glass substrates held in the carrier. Then, in this state, the glass substrates are polished when the carrier orbits while rotating on its axis. By controlling this state, the surface shape of the substrates can be controlled. Specifically, in order to properly obtain the magnetic disk substrate (magnetic disk glass substrate) according to this embodiment, it is preferable to set the ratio between the on-its-axis rotation speed and the orbital rotation speed of the carrier within a range of 0.15 to 6.

Then, the magnetic disk substrate obtained through the above-mentioned processes is defect-controlled such that when laser light with a wavelength of 405 nm and a laser power of 25 mW is irradiated with a spot size of 5 μm onto the substrate and scattered light from the substrate is detected, the number of defects detected to have a size of 0.1 μm to not more than 0.3 μm is less than 50 per 24 cm$^2$, and further that, with respect to these defects, there is no defect in which, in a bearing curve obtained by the bearing curve plot method using an atomic force microscope, a portion from an apex of the defect to 45% thereof is located in an area of defect height higher than a virtual line connecting from the apex of the defect to 45% thereof. Therefore, it is possible to suppress the occurrence of failure in an HDD device in which a magnetic head with a very small flying height, such as a DFH head, is mounted.

The magnetic disk substrate according to this invention is preferably configured such that the substrate has a disk shape with a hole at the center thereof and, assuming that the distance from the center to the outermost periphery is 100%, a difference (RaO-Ral) between an arithmetic mean roughness (RaO) of a main surface in a range of 80% to 90% from the center and an arithmetic mean roughness (Ral) of the main surface in a range of 10 to 20% from the center is 0.01 or less (a value when a 2 μm×2 μm square measurement area is measured using an atomic force microscope with a resolution of 256×256 pixels). With this structure, when used as a magnetic disk, it is possible to reduce variation in S/N on the inner peripheral side and the outer peripheral side of the substrate. For manufacturing the magnetic disk substrate of such a structure, final polishing may be carried out using the planetary gear type polishing machine, for example.

The magnetic disk substrate according to this invention preferably has a structure which is for use as a substrate for a heat assisted magnetic recording (heat assisted magnetic recording medium) type magnetic disk.

In the heat assisted magnetic recording type magnetic disk, an area for recording information is locally heated to record the information and then the recorded area is rapidly cooled to stabilize the magnetic state. In such a case, if a defect of the above-mentioned specific shape is present on the substrate, the difference in heated temperature occurs between a magnetic film formed on the defect and a magnetic film in other places, thus causing failure in information recording. Since the reliability also decreases, it is preferable that the magnetic disk substrate according to this invention be used as a magnetic disk substrate for use in a heat assisted magnetic recording type magnetic disk.

The magnetic disk substrate according to this invention may have a structure in which only one of its main surfaces is free of the presence of a defect of the above-mentioned specific shape. In this case, using the surface with no defect of the specific shape as a recording surface, it is possible to manufacture a magnetic disk with only one surface serving as a magnetic recording surface.

Next, a description will be given of Examples which were carried out for clarifying the effect of this invention. Herein, a description will be given of the case where a glass substrate was used as a magnetic disk substrate.

EXAMPLE

Hereinbelow, a description will be given of an Example about methods of manufacturing a magnetic disk substrate and a magnetic disk to which this invention is applied. These magnetic disk substrate and magnetic disk are manufactured as a magnetic disk having a predetermined shape, such as a 3.5-inch disk (φ89 mm) or a 2.5-inch disk (φ65 mm).

(1) Shaping Process and First Lapping Process

In the magnetic disk substrate manufacturing method according to this Example, first, lapping (grinding) is applied to surfaces of a plate-like glass to obtain a glass base member, then this glass base member is cut, thereby cutting out a glass disk. As the plate-like glass, one of various plate-like glasses can be used. This plate-like glass can be manufactured by a known manufacturing method such as a press method, a float method, a downdraw method, a redraw method, or a fusion method using, for example, a molten glass as a material. If the press method is used among them, the plate-like glass can be manufactured at low cost.

In this Example, a molten aluminosilicate glass was molded into a disk shape by direct pressing using upper, lower, and drum molds, thereby obtaining an amorphous plate-like glass. As the aluminosilicate glass, use was made of a glass containing, as main components, $SiO_2$: 58 wt % to 75 wt %, $Al_2O_3$: 5 wt % to 23 wt %, $Li_2O$: 3 wt % to 10 wt %, and $Na_2O$: 4 wt % to 13 wt %.

Then, lapping was applied to both main surfaces of the plate-like glass, thereby obtaining a disk-shaped glass base member. The lapping was carried out using a double-side lapping machine employing a planetary gear mechanism with the use of alumina-based free abrasive particles. Specifically, the lapping was carried out by pressing lapping surface plates onto both surfaces of the plate-like glass from the upper and lower sides, supplying a grinding liquid containing the free abrasive particles onto the main surfaces of the plate-like glass, and relatively moving the plate-like glass and the surface plates to each other. By this lapping, the glass base member having the flat main surfaces was obtained.

(2) Cutting-Out Process (Coring, Forming, Chamfering)

Then, the glass base member was cut using a diamond cutter, thereby cutting out a disk-shaped glass substrate from the glass base member. Then, using a cylindrical diamond drill, an inner hole was formed at a central portion of the glass substrate, thereby obtaining an annular glass substrate (coring). Then, grinding was applied to an inner peripheral end face and an outer peripheral end face using diamond grindstones, thereby carrying out predetermined chamfering (forming, chamfering).

(3) Second Lapping Process

Then, second lapping was applied to both main surfaces of the obtained glass substrate in the same manner as in the first lapping process. By carrying out this second lapping process, fine irregularities formed on the main surfaces in the cutting-out process or an end face polishing process as a preceding process can be removed in advance, so that it becomes possible to complete a subsequent main surface polishing process in a short time.

(4) End Face Polishing Process

Then, the outer peripheral end face and the inner peripheral end face of the glass substrate were mirror-polished by a brush polishing method. In this event, as polishing abrasive particles, use was made of a slurry (free abrasive particles) containing cerium oxide abrasive particles. Then, the glass substrate having been subjected to the end face polishing process was washed with water. By this end face polishing process, the end faces of the glass substrate were finished to a mirror surface state that can prevent precipitation of sodium and potassium.

(5) Main Surface Polishing Process (First Polishing Process)

A first polishing process was first carried out as a main surface polishing process. This first polishing process mainly aims to remove cracks or strains remaining on the main surfaces during the above-mentioned lapping processes. In this first polishing process, the main surfaces were polished using a double-side polishing machine having a planetary gear mechanism with the use of a hard resin polisher. Cerium oxide abrasive particles were used as an abrasive.

(6) Chemical Strengthening Process

Then, chemical strengthening was applied to the glass substrate having been subjected to the above-mentioned lapping processes and polishing processes. The chemical strengthening was carried out by preparing a chemical strengthening solution in the form of a mixture of potassium nitrate (60%) and sodium nitrate (40%), heating this chemical strengthening solution to 400° C. and preheating the cleaned glass substrate to 300° C., and immersing it in the chemical strengthening solution for about 3 hours. The immersion was carried out in the state where a plurality of glass substrates were placed in a holder so as to be held at their end faces, thereby enabling the entire surfaces of the glass substrates to be chemically strengthened.

By carrying out the immersion treatment in the chemical strengthening solution as described above, lithium ions and sodium ions in a surface layer of the glass substrate are replaced by sodium ions and potassium ions in the chemical strengthening solution, respectively, so that the glass substrate is strengthened. The thickness of a compressive stress layer formed at the surface layer of the glass substrate was about 100 µm.

The glass substrate having been subjected to the chemical strengthening treatment was immersed in a water bath at 20° C. so as to be rapidly cooled and was maintained for about 10 minutes. Then, the rapidly cooled glass substrate was immersed in 10 wt % sulfuric acid heated to about 40° C., so as to be cleaned. Further, the glass substrate having been subjected to the sulfuric acid cleaning was immersed in respective cleaning baths of pure water and IPA (isopropyl alcohol) in turn so as to be cleaned.

(7) Main Surface Polishing Process (Final Polishing Process)

Then, a second polishing process was carried out as a final polishing process. This second polishing process aims to finish the main surfaces to a mirror surface state. In this second polishing process, the main surfaces were mirror-polished using a double-side polishing machine having a planetary gear mechanism with the use of a soft resin foam polisher. As an abrasive, use was made of cerium oxide abrasive particles (average particle size 0.8 µm) finer than the cerium oxide abrasive particles used in the first polishing process. The glass substrate having been subjected to the second polishing process was immersed in respective cleaning baths of neutral detergent, pure water, and IPA in turn so as to be cleaned. An ultrasonic wave was applied to each cleaning bath.

By carrying out the first lapping process, the cutting-out process, the second lapping process, the end face polishing process, the first polishing process, the chemical strengthening process, and the second polishing process as described above, there was obtained a flat, smooth, and high-rigidity magnetic disk substrate.

(8) Magnetic Disk Manufacturing Process

On each of both surfaces of the glass substrate obtained through the above-mentioned processes, an adhesive layer of a Cr alloy, a soft magnetic layer of a CoTaZr-group alloy, an underlayer of Ru, a nonmagnetic underlayer having a granular structure, a perpendicular magnetic recording layer having a granular structure of a CoCrPt-based alloy, a protective layer of hydrocarbon, and a lubricating layer of perfluoropolyether were formed in this order, thereby manufacturing a perpendicular magnetic recording disk. More specifically, an adhesive layer of CrTi, a soft magnetic layer of CoTaZr/Ru/CoTaZr, an intermediate layer of Ru, a nonmagnetic granular underlayer of $CoCrSiO_2$, a granular magnetic layer of $CoCrPt-SiO_2.TiO_2$, and a hydrogenated carbon protective film were formed in this order on the glass substrate using an in-line type sputtering apparatus and further a perfluoropolyether lubricating layer was formed by a dipping method, thereby obtaining a magnetic disk.

(9) Magnetic Disk Device Manufacturing Process

By incorporating the above-mentioned magnetic disk into a device, a magnetic disk device was manufactured. Since the structure of a magnetic disk device is known, a detailed description thereof is omitted herein.

Example 1

By applying the following polishing conditions to the second polishing process of (7) Main Surface Polishing Process (Final Polishing Process) described above, a magnetic disk substrate, a magnetic disk, and a magnetic disk device were manufactured. In this Example, a 2.5-inch disk (φ65 mm) was manufactured. The specific polishing conditions were such that the hardness of polishing pads was set to 85 (Asker C hardness), the particle size of an abrasive to 0.8 µm, the processing rate to 0.30 µm/min, and the processing pressure to 9 Pa. More specifically, the processing pressure in the final polishing process was changed in two stages so that, after performing polishing at a main processing pressure of 9 Pa for a predetermined time, polishing was performed at a processing pressure of 1 Pa for a time half the predetermined time. In this event, the product of the main processing pressure and the processing rate (main processing pressure×processing rate) was 2.7.

Then, the surface roughness of the magnetic disk glass substrate in this event was measured using an atomic force microscope (AFM) with a resolution of 256×256 pixels in a 2 µm square and, as a result, the arithmetic mean roughness (Ra) was 0.12 nm.

Then, the magnetic disk glass substrate and the magnetic disk obtained in the above-mentioned Example were subjected to a defect inspection using the optical defect inspection apparatus (manufactured by KLA-Tencor Corporation, trade name: OSA6100) shown in FIG. 4. In this event, an area of 15 mm to 31.5 mm from the center of the substrate was measured under the measurement conditions that the laser wavelength was set to 405 nm and the laser spot size to 5 µm. As a result, the number of defects detected to have a size of 0.1 µm to 0.3 µm was 40 (42 in the case of the magnetic disk) per 24 $cm^2$. Further, bearing curves were obtained for the defects by the bearing curve plot method using the AFM and, as a result, any of the defects was a defect in which a portion from an apex of the defect to 45% thereof was located in an area of defect height lower than a virtual line connecting from the apex of the defect to 45% thereof (a defect that exhibits a curve like C2 shown in FIG. 3), i.e. there was no such a defect in which a portion from an apex of the defect to 45% thereof was located in an area of defect height higher than a virtual line connecting from the apex of the defect to 45% thereof (a defect that exhibits a curve like C1 shown in FIG. 3) (hereinafter may be referred to as a specific defect).

An underlayer, a magnetic layer, a protective layer, and a lubricating layer were stacked in this order on this glass substrate, thereby manufacturing the magnetic disk. In this event, since the amount of contamination on a main surface of the glass substrate was at a very low level, the orientations of magnetic particles by sputtering were aligned so that it was possible to form the magnetic layer capable of high density recording.

A certification test was conducted for this magnetic disk. The certification test was conducted by examining the TA rate in a thermal asperity (Thermal Asperity: TA (phenomenon that occurs when a magnetic head collides with a magnetic disk) test. The TA test was conducted by mounting the magnetic disk in an HDD device provided with a GMR (Giant MagnetoResistance) head, setting the disk peripheral speed to 8 m/s, and amplifying a signal outputted from the GMR head to observe it in a digital oscilloscope, thereby counting TA waveforms observed in the oscilloscope. As a result, TA counts were 5 or less per surface and thus it was seen that the number of times of collision of the magnetic head with the magnetic disk was small. In this event, the flying height of the head was 8 nm.

Further, a long-term reliability test was conducted for this magnetic disk. As the long-term reliability test, the durability was examined when the magnetic disk was mounted in a load/unload type HDD device. The durability test was conducted by carrying out load/unload tests in a predetermined number of times (1,000,000 times) using a DFH head with a head flying height (slider flying height) of 9 nm (the flying height of a read element was 2 nm). As a result, no failure such as head crash occurred on the magnetic disk manufactured from the glass substrate. This is considered to be because there was no such a defect in which, in the bearing curve, the portion from the apex of the defect to 45% thereof was located in the area of defect height higher than the virtual line connecting from the apex of the defect to 45% thereof (a defect that causes failure on the head) (a specific defect).

Comparative Example 1

A magnetic disk substrate, a magnetic disk, and a magnetic disk device according to a Comparative Example were manufactured by the above-mentioned manufacturing method except that the polishing conditions of the second polishing process were set to the following conditions. The specific polishing conditions in the Comparative Example were such that the hardness of polishing pads was set to 85 (Asker C hardness), the particle size of an abrasive to 1.0 μm, the processing rate to 0.60 μm/min, and the processing pressure to 12.0 Pa. In this polishing process, polishing was carried out while maintaining a main processing pressure of 12.0 Pa without dropping the processing pressure thereafter. In this event, the product of the main processing pressure and the processing rate (main processing pressure×processing rate) was 7.2. As a result of examining, with respect to the obtained magnetic disk substrate and magnetic disk, defects which were detected to have a size of 0.1 μm to 0.3 μm by the OSA apparatus in the same manner as in the Example, the number of the defects was 41 (44 in the case of the magnetic disk) per 24 cm². Further, in the same manner as in the Example, bearing curves were obtained for the defects by the bearing curve plot method using the AFM. As a result, there was a defect in which a portion from an apex of the defect to 45% thereof was located in an area of defect height higher than a virtual line connecting from the apex of the defect to 45% thereof (a defect that exhibits a curve like C1 shown in FIG. 3) (a specific defect).

Then, a certification test was conducted for this magnetic disk in the same manner as in the Example. As a result, TA counts were 30 or more per surface and thus the number of times of collision of the magnetic head with the magnetic disk was relatively large. Further, a long-term reliability test was conducted for this magnetic disk in the same manner as in the Example and, as a result, a head crash occurred when 300,000 times were reached. This is considered to be because there was such a defect in which, in the bearing curve, the portion from the apex of the defect to 45% thereof was located in the area of defect height higher than the virtual line connecting from the apex of the defect to 45% thereof (a defect that causes failure on the head) (a specific defect).

As described above, according to this invention, by causing the additive contained in the polishing liquid for use in the polishing process to be contained in the cleaning liquid for use in the cleaning process, it is possible to perform defect control such that when laser light with a wavelength of 405 nm and a laser power of 25 mW is irradiated with a spot size of 5 μm onto the substrate and scattered light from the substrate is detected, the number of defects detected to have a size of 0.1 μm to not more than 0.3 μm is less than 50 per 24 cm², and further that, with respect to these defects, there is no defect (specific defect) in which, in a bearing curve obtained by the bearing curve plot method using the atomic force microscope, a portion from an apex of the defect to 45% thereof is located in an area of defect height higher than a virtual line connecting from the apex of the defect to 45% thereof. Therefore, it is possible to suppress the occurrence of failure in an HDD device in which a magnetic head with a very small flying height, such as a DFH head, is mounted.

(Influence in Substrate Surface Roughness)

Hereinbelow, the influence of this invention in the substrate surface roughness was examined. Specifically, the influence on S/N, TA counts, and long-term reliability was examined when the substrate surface roughness (surface roughness when a 2 μm×2 μm square measurement area was measured using an atomic force microscope with a resolution of 256× 256 pixels) and the number of specific defects were changed (an experiment was carried out by manufacturing magnetic disks). The results thereof are shown in Table 1. In the following Examples A and Comparative Examples A, there was no large difference in the number of defects detected to have a size of 0.1 μm to 0.3 μm and use was made of the magnetic disks with about 40 defects.

TABLE 1

| | Number of Specific Defects | Surface Roughness Ra (nm) | S/N [db] | TA Counts (number/ surface) | Long-Term Reliability Test |
|---|---|---|---|---|---|
| Example A-1 | 0 | 0.15 | 15.2 | 3 | 1,000,000 Times |
| Example A-2 | 0 | 0.10 | 15.3 | 5 | 1,000,000 Times |
| Example A-3 | 0 | 0.20 | 14.8 | 4 | 700,000 Times |
| Comparative Example A-1 | 2 | 0.11 | 15.3 | 33 | x |
| Comparative Example A-2 | 5 | 0.26 | 14.6 | 36 | x |
| Comparative Example A-3 | 7 | 0.13 | 15.2 | 39 | x |

With respect to the long-term reliability test, the number of successful times is shown on the order of 100,000 times and tests were carried out up to a maximum of 1,000,000 times. In the table, "x" represents that a crash occurred when or before 300,000 times were reached.

From the above-mentioned results, it is seen that when specific defects are present, the results of the long-term reliability test are bad and thus use as a magnetic disk is not allowed. Crashed heads in Comparative Examples A1 to A3 were observed using a microscope and, as a result, read elements of the DHF heads were chipped off. Then, as a result of performing elemental analysis around the specific defects of the magnetic disk of Comparative Example A1 after conducting the long-term reliability test, part of elements forming the DFH head was detected. Accordingly, it is presumed that the DFH head collided with the specific defects. That is, it is seen that the magnetic disk glass substrate according to this invention can be suitably used as a substrate of a magnetic disk adapted for a DFH (dynamic fly Hight) head.

(Influence in Defect Size and Shape)

Then, the influence in the defect size and shape was examined. Specifically, by changing the above-mentioned manufacturing conditions, there were manufactured 100 magnetic disk glass substrates (Example B-1) each having no specific defect but having a greater number of defects of 0.3 μm or more as compared with later-described Comparative Example B-1 and 100 magnetic disk glass substrates (Comparative Example B-1) each having specific defects but having a smaller number of defects of 0.3 μm or more as compared with Example B-1 described above, and then a long-term reliability test was conducted for them. The results thereof are shown in Table 2. In Example B and Comparative Example B, there was no large difference in the number of defects detected to have a size of 0.1 μm to 0.3 μm and use was made of the magnetic disk glass substrates with about 40 defects.

TABLE 2

|  | Number of Specific Defects | Number of Defects of 0.3 μm or more | Long-Term Reliability Test (500,000 Times) |
| --- | --- | --- | --- |
| Example B-1 | 0 | 12-25 | 100% |
| Comparative Example B-1 | 3-5 | 8-20 | 30% |

Herein, with respect to the long-term reliability test, the ratio of passing 500,000-times load/unload tests is shown.

With respect to the number of specific defects and the number of defects of 0.3 μm or more, the maximum and minimum values among 100 substrates are shown and, with respect to the long-term reliability test, the average value is shown.

From these results, it is seen that the reliability of a magnetic disk is largely affected not only by the size and number of defects, but also by the number of specific defects. Specifically, it is seen that the reliability test is largely affected not by the number of defects larger than a specific defect, but by the number of specific defects.

This invention is not limited to the above-mentioned embodiment and can be carried out by appropriately changing it. For example, although the description has been given of the case where the magnetic disk substrate is the glass substrate in the above-mentioned embodiment, this invention is similarly applicable to the case where a magnetic disk substrate is an aluminum alloy substrate or the like. Further, in the above-mentioned embodiment, the sensitivity of the apparatus shown in FIG. 4 and the scattered light detection method are only examples, and these can be appropriately changed within a range not departing from the technical idea of this invention. The number of components, the sizes, the processing sequences, and so on in the above-mentioned embodiment are only examples and this invention can be carried out by changing them in various ways within a range capable of exhibiting the effect of this invention. Other than those, this invention can be carried out with appropriate changes within a range not departing from the object of this invention.

DESCRIPTION OF SYMBOLS 1 magnetic disk substrate
11 laser
12, 21 detector

The invention claimed is:

1. A magnetic disk glass substrate having a main surface, the magnetic disk glass substrate being used as a magnetic disk substrate adapted for a DFH (dynamic fly height) head,
   wherein a surface roughness Ra is 0.15 nm or less when a 2 μm×2 μm square measurement area of the main surface of the substrate is measured using an atomic force microscope with a resolution of 256×256 pixels, and
   wherein when laser light with a wavelength of 405 nm and a power of 25 mW is irradiated with a spot size of 5 μm onto the main surface of the substrate and scattered light from the main surface of the substrate is detected, a number of defects detected to have a size of 0.1 μm or more and 0.3 μm or less is less than 50 (0 exclusive) per 24 cm$^2$ and, with respect to all the defects detected, there is no defect in which, in a bearing curve obtained by a bearing curve plot method using the atomic force microscope, a portion from an apex (height at 0%) of the defect to a height at 45% thereof is located in an area of defect height higher than a virtual line connecting between the apex (height at 0%) of the defect and a point of the height at 45%.

2. The magnetic disk glass substrate according to claim 1, wherein, with respect to only one main surface, the surface roughness Ra is 0.15 nm or less when the 2 μm×2 μm square measurement area of the main surface is measured using the atomic force microscope with the resolution of 256×256 pixels, and
   wherein when the laser light with the wavelength of 405 nm and the power of 25 mW is irradiated with the spot size of 5 μm onto the main surface of the substrate and the scattered light from the main surface of the substrate is detected, the number of the defects detected to have the size of 0.1 μm or more and 0.3 μm or less is less than 50 (0 exclusive) per 24 cm$^2$ and, with respect to all the defects detected, there is no defect in which, in the bearing curve obtained by the bearing curve plot method using the atomic force microscope, the portion from the apex (height at 0%) of the defect to the height at 45% is located in the area of defect height higher than the virtual line connecting between the apex (height at 0%) of the defect and the point of the height at 45%.

3. The magnetic disk glass substrate according to claim 1, wherein the magnetic disk glass substrate is used as a magnetic disk substrate of a heat assisted magnetic recording type.

4. The magnetic disk glass substrate according to claim 1, wherein the substrate has a disk shape with a hole at a center thereof and, assuming that a distance from the center to an outermost periphery is 100%, a difference (RaO-RaI) between an arithmetic mean roughness (RaO) of the main surface in a range of 80% to 90% from the center and an arithmetic mean roughness (RaI) of the main surface in a range of 10 to 20% from the center is 0.01 or less (a value when the 2 μm×2 μm square measurement area is measured using the atomic force microscope with the resolution of 256×256 pixels).

5. A magnetic disk substrate, the magnetic disk glass substrate being used as a magnetic disk substrate adapted for a DFH (dynamic fly height) head, wherein when laser light with a wavelength of 405 nm and a laser power of 25 mW is irradiated with a spot size of 5 μm onto the substrate and scattered light from the substrate is detected, a number of defects detected to have a size of 0.1 μm to not more than 0.3 μm is less than 50 (0 exclusive) per 24 cm$^2$ and, with respect to the defects, there is no defect in which, in a bearing curve obtained by a bearing curve plot method using an atomic force microscope, a portion from an apex (height at 0%) of the defect to 45% thereof is located in an area of defect height higher than a virtual line connecting from the apex (height at 0%) of the defect to 45% thereof.

6. The magnetic disk substrate according to claim 5, wherein the atomic force microscope is an atomic force microscope with a resolution of at least 256×256 pixels in a 2 μm square.

7. The magnetic disk substrate according to claim 5, wherein the magnetic disk substrate is made of an aluminosilicate glass.

8. A magnetic disk comprising the magnetic disk substrate according to claim 5 and a magnetic recording layer formed on the magnetic disk substrate.

9. A magnetic disk, the magnetic disk being adapted for a DFH (dynamic fly height) head, wherein when laser light with a wavelength of 405 nm and a laser power of 25 mW is irradiated with a spot size of 5 μm and scattered light from the substrate is detected, a number of defects detected to have a size of 0.1 μm to not more than 0.3 μm is less than 50 (0 exclusive) per 24 cm$^2$ and, with respect to the defects, there is no defect in which, in a bearing curve obtained by a bearing curve plot method using an atomic force microscope, a portion from an apex (height at 0%) of the defect to 45% thereof is located in an area of defect height higher than a virtual line connecting from the apex (height at 0%) of the defect to 45% thereof.

* * * * *